H. A. FORKNER.
DEMOUNTABLE RIM SPREADER.
APPLICATION FILED OCT. 12, 1917.

1,304,674.

Patented May 27, 1919.

Witness

Inventor
Henry A. Forkner.
By G. W. Earnshaw
Attorney

UNITED STATES PATENT OFFICE.

HENRY A. FORKNER, OF JOPLIN, MISSOURI.

DEMOUNTABLE-RIM SPREADER.

1,304,674.

Specification of Letters Patent.

Patented May 27, 1919.

Application filed October 12, 1917. Serial No. 196,173.

*To all whom it may concern:*

Be it known that I, HENRY A. FORKNER, a citizen of the United States, residing at Joplin, in the county of Jasper and State of Missouri, have invented certain new and useful Improvements in Demountable-Rim Spreaders, of which the following is a specification.

My invention relates to apparatus adapted for expanding a demountable rim, after the same has been contracted, for the reception of the tire casing or shoe, while not necessarily restricted to this use.

An important object of the invention is to provide apparatus of the above mentioned character, including parts which may be operated by the ordinary type of automobile jack.

A further object of the invention is to provide apparatus of the above mentioned character, formed of few parts, which may be collapsed in a compact manner, for the purpose of transportation.

Other objects and advantages of the invention will be apparent during the course of the following description.

Figure 1:
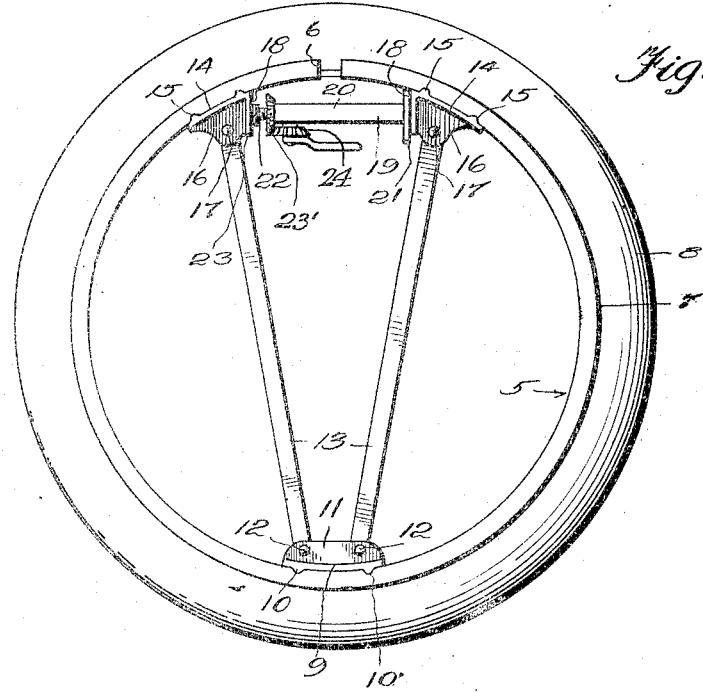
Figures 2, 3:
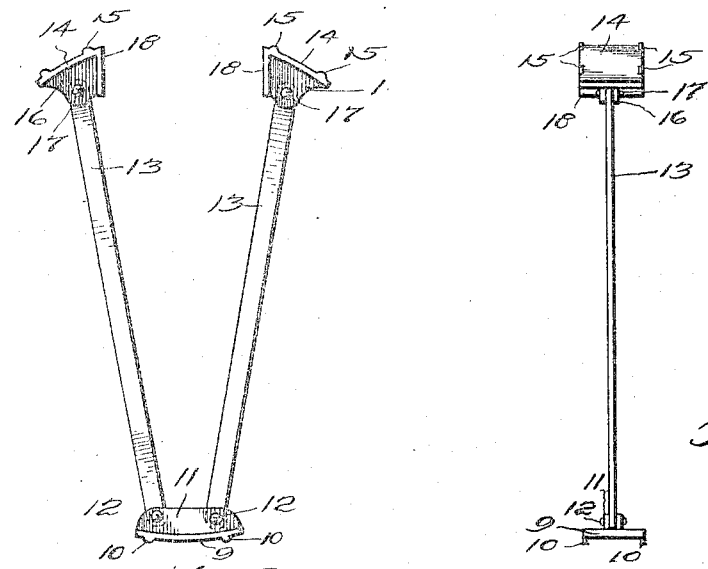

In the accompanying drawings forming a part of this specification and in which like numerals are employed to designate like parts throughout the same, Figure 1 is a side elevation of apparatus embodying my invention, showing the same in use, Fig. 2 is a similar view of the apparatus removed from the rim, and, Fig. 3 is an edge elevation of the apparatus.

In the drawings, wherein for the purpose of illustration is shown a preferred embodiment of my invention, the numeral 5 designates a metallic demountable rim, which is cut or split transversely at 6. This rim is provided with flanges 7, for engagement with the edges or beads of a tire casing or shoe 8, as is well known.

My expanding apparatus comprises a plate or base 9, curved longitudinally to conform to the rim 7 and provided at its edges with flanges 10 for the reception therebetween of the rim 7. The plate or base 9 is provided with longitudinally extending ribs or flanges 11, provided near their ends with apertures for the reception of pivot elements or bolts 12, as shown.

The numeral 13 designates arms or bars, corresponding ends of which project between the flanges 11, and are apertured for receiving the pivot elements or bolts 12, whereby serving to pivotally connect the arms to the plate or base 9.

The numeral 14 designates heads, curved longitudinally to conform to the curvature of the rim 7 and provided with flanges 15, to receive therebetween the rim 7. The heads 14 are provided with flanges or ribs 16, spaced for the reception therebetween of the ends of the arms 13, which are pivoted thereto by means of pivot elements or bolts 17, as shown. The heads 14 are provided upon their inner ends with flat faces 18, to contact with the ends of the relatively movable parts, of an automobile jack 19, of any well known or preferred construction.

This jack is shown as comprising a standard 20, provided at one end with a base or foot 21 contacting with one face 18. Having screw-threaded engagement within the standard 20 is a lift screw 22, having a head 23, swiveled thereto, and contacting with the face 18. The screw 22 is engaged by a beveled gear 23′, adapted to reciprocate the same and this bevel gear is driven by a second bevel gear 24, receiving its rotation from any suitable means.

In the use of the apparatus, after the rim 7 is collapsed, whereby one end thereof is arranged inwardly of the other end, in overlapping relation, and the tire casing or shoe 8 is arranged upon the rim, the apparatus is placed within the rim, with the base and heads 14, contacting therewith, as shown in Fig. 1. Upon the operation of the jack 19, it is obvious that the heads 14 will be moved away from each other, thereby expanding the rim 7 until the overlapping ends thereof are again brought into alinement, and secured in such alinement by the usual means. It is obvious that the apparatus will dispense with the use of hammering and prying, which is ordinarily necessary in expanding this type of rim.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. Apparatus for expanding a demountable rim, comprising a base to contact with the inner side of the rim, arms pivotally connected with the base, heads adapted to contact with the opposite side of the inner portion of the rim at spaced points and pivotally connected with the arms, and means arranged between the heads to move them away from each other.

2. Apparatus of the character described, comprising a base to contact with the rim, arms pivotally connected with the base, heads pivotally connected with the arms to contact with the rim at spaced points and provided upon their inner ends with approximately parallel contacting faces adapted to contact with the relatively reciprocatory elements of a jack.

3. Apparatus of the character described, comprising a base to contact with the rim, arms pivotally connected with the base, heads carried by the opposite ends of the arms to contact with the rim at spaced points and having substantially flat approximately parallel faces formed upon the inner ends thereof, to engage with the relatively reciprocatory elements of a jack.

4. Apparatus for expanding a demountable rim, including an approximately triangular structure to contact with the rim at three points, said structure including a base to contact with the rim, movable arms connected with the base and adapted to be moved laterally with relation thereto, a pair of heads carried by the opposite ends of the arms to contact with the rim at spaced points, and means to move said opposite ends of the arms away from each other.

5. Apparatus for expanding a demountable rim, comprising a pair of angularly arranged arms, each arm being substantially longer than the radius of the rim whereby its opposite ends may be disposed adjacent opposite portions of the rim; a base to contact with the rim and having pivotal connections with corresponding ends of the arms; a pair of heads pivotally connected with the opposite corresponding ends of the arms to contact with the rim; and means disposed between the heads to move them away from each other, said means coacting with the angularly arranged arms to constitute the base of a triangle formed by said arms and means.

In testimony whereof I affix my signature in presence of two witnesses.

HENRY A. FORKNER.

Witnesses:
ETHEL WRIGHT,
J. A. SNYDER.